Dec. 11, 1951 E. COHRT 2,577,740

TELEPHONE EXCHANGE SYSTEM

Filed July 1, 1947 5 Sheets-Sheet 1

INVENTOR.
EIGIL COHRT

BY

Robert Harding Jr.
ATTORNEY

INVENTOR.
EIGIL COHRT

BY

Robert Harding Jr.
ATTORNEY

Dec. 11, 1951 E. COHRT 2,577,740

TELEPHONE EXCHANGE SYSTEM

Filed July 1, 1947 5 Sheets-Sheet 3

INVENTOR.
EIGIL COHRT

Robert Harding Jr.
ATTORNEY

INVENTOR.
EIGIL COHRT

Robert Harding Jr.
ATTORNEY

INVENTOR.
EIGIL COHRT
BY
Robert Harding Jr.
ATTORNEY

Patented Dec. 11, 1951 2,577,740

UNITED STATES PATENT OFFICE 2,577,740

TELEPHONE EXCHANGE SYSTEM

Eigil Cohrt, Copenhagen, Denmark, assignor to International Standard Electric Corporation, New York, N. Y., a corporation of Delaware Application July 1, 1947, Serial No. 758,452
In Denmark October 23, 1945

Section 1, Public Law 690, August 8, 1946
Patent expires October 23, 1965

9 Claims. (Cl. 179—27)

Figure 1:
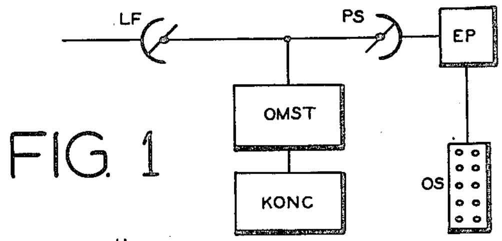

The present invention relates to a telephone exchange system having operators' positions and means for concentrating traffic at an arbitrary number of these positions.

Manually operated operators' positions are to be found in manually operated telephone exchanges as well as in full automatic telephone exchanges, for instance for establishing the toll subscriber calls. As the number of toll conversations vary very much at the different times of day and night it would be desirable to be able to put an arbitrary number of positions out of operation and let other positions take care of all the calls. In exchanges using automatic distribution this kind of distribution of incoming calls will be of no inconvenience when an arbitrary number of positions are put out of operation, each operator's position being able to take care of all conversations through the automatic equipment. The inconveniences appear, however, when calls are received for a certain position, for instance a call from a subscriber who has ordered a toll call and wants to ask a question at the operator's position that has received the order and which is to establish the conversation. These inconveniences increase with the growth of the toll exchange, and the object of the invention is to meet these inconveniences by indicating a telephone system of the said kind in which calls to a certain operator's position may be routed to a wanted other operator's position.

The characteristical feature of the invention is a concentration circuit common to all the operators' positions which by being taken into use through a pair of service and recording links determines whether a call received at an operator's position is to be taken care of by this or not, and if not, to take care that it is routed to the operator's position that is to take care of it.

According to an embodiment of the invention a transfer circuit may be found between the pair of service and recording links and the concentration circuit and is arranged in such a way that it may register the wanted position number and then by means of the concentration circuit possibly get this number checked so that the call is routed to the position that is to take care of the call.

According to the invention each operator's position may be provided with a switch for indicating the position to which calls for a certain operator's position are to be routed, which switch is adjusted to the number of the position to take charge of the position in question.

According to a suitable embodiment of the invention a positional circuit relay may be provided for selection of the switch belonging to a called position.

As it may happen that a position, to which a call is switched over, is itself switched over to another position, means may be found according to the invention in the concentration circuit, for instance 10's digit-relays and units' digit-relays, arranged for successive selection of the positions in a successive concentration.

According to a suitable embodiment of the invention the means for successive selection of the position switches may be arranged for possibly switching-over the number of the wanted position registered in the switching circuit.

In order to control whether a selection of the switching keys has been finished or is to be continued the invention provides "own position relays" and "other position relays."

According to an embodiment of the invention the means for selection of positional relays may consist of relays, whereby the selection takes place quicker than when using selectors.

In order that a call may be instantly routed to a supervisor in case it fails for some reason or other, for instance because the switch is not switched over to another position and the operator is not present, means may be found according to the invention, for instance a "position staffed relay," a "position nonstaffed relay," a fault-relay and a supervisor relay for making the necessary switching over.

If the concentration circuit due to a fault does not give the necessary "ready" signal, the switching circuit may be provided with means according to an embodiment of the invention, for instance a supervisor auxiliary relay and a supervisor relay which after a predetermined period routes the call to the supervisor.

Figure 5A:
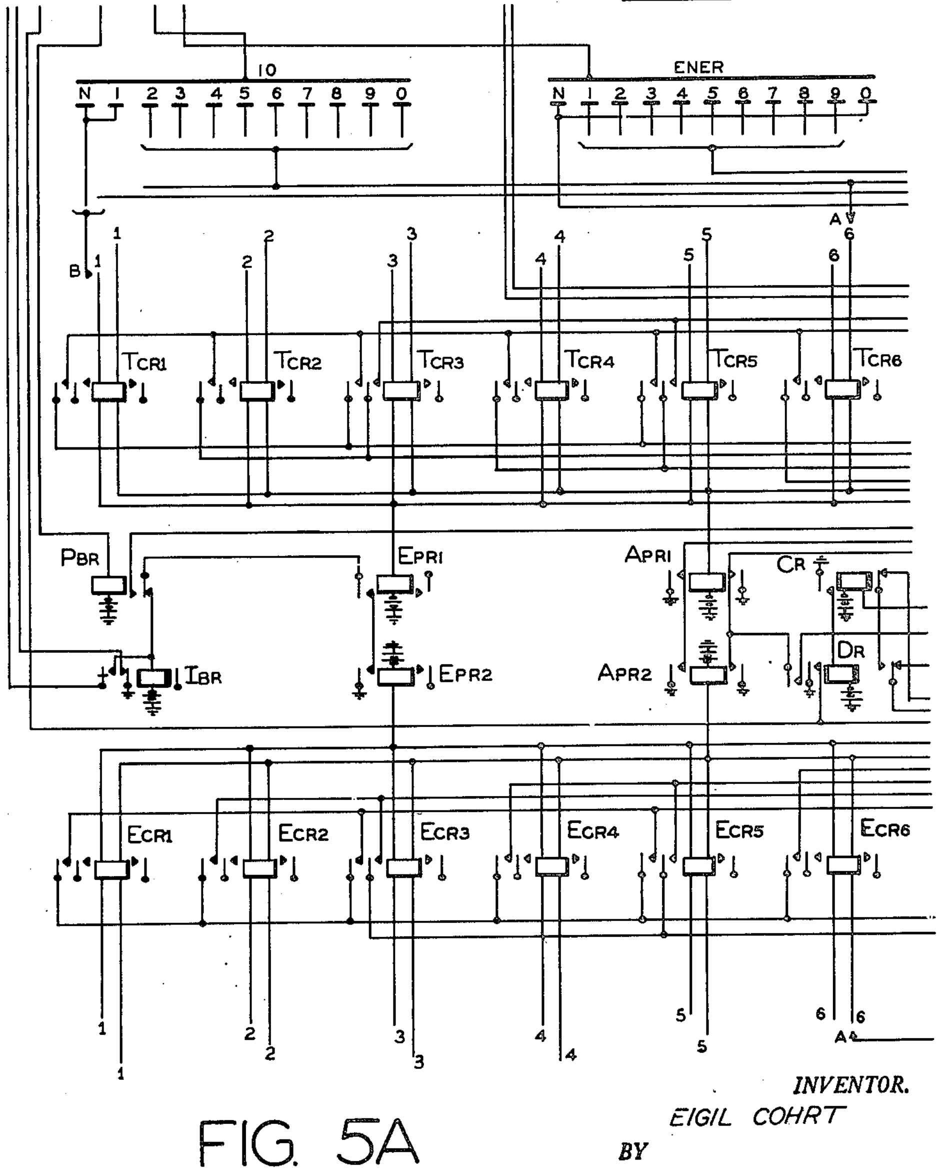
Figure 2:
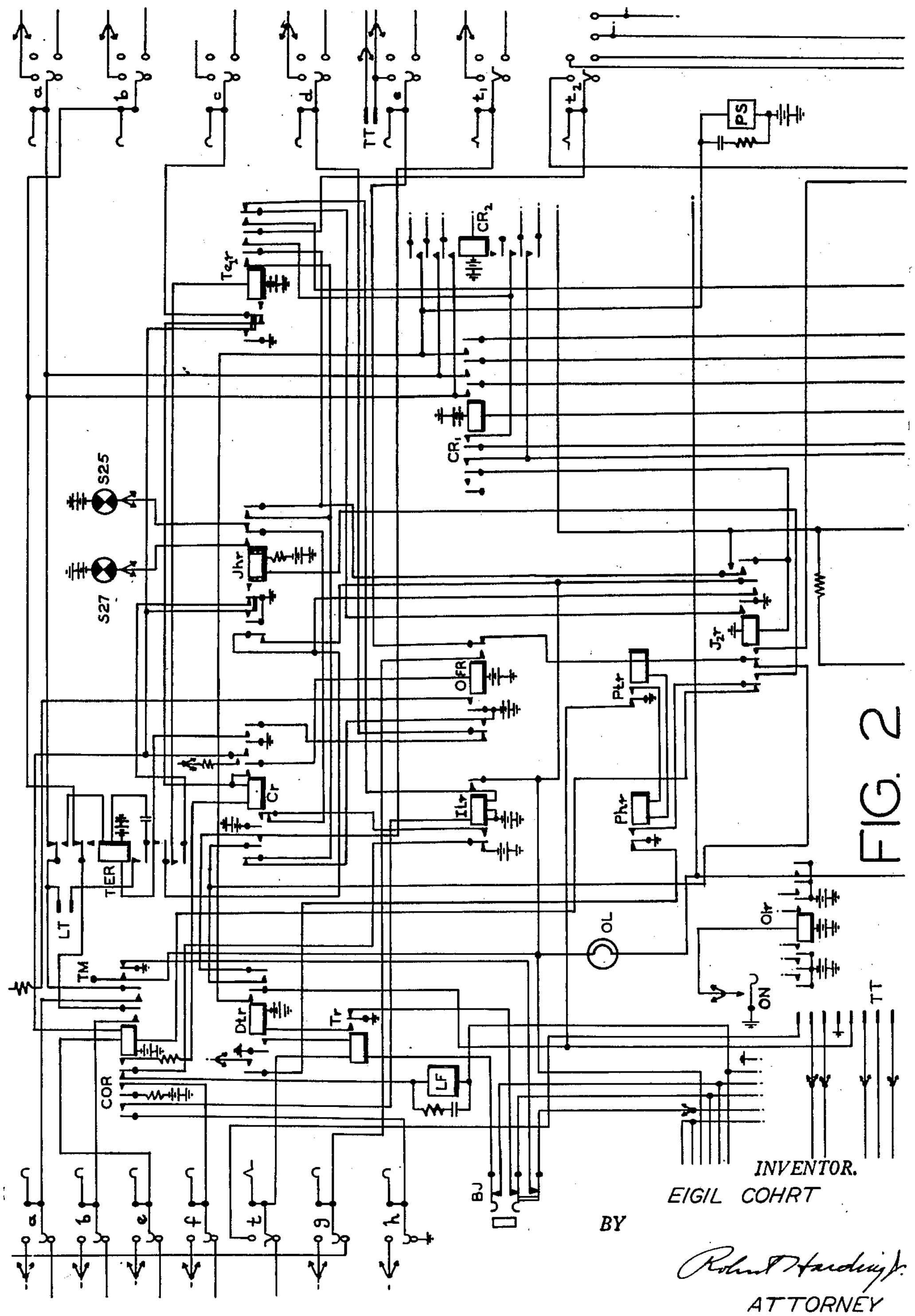
Figure 3:
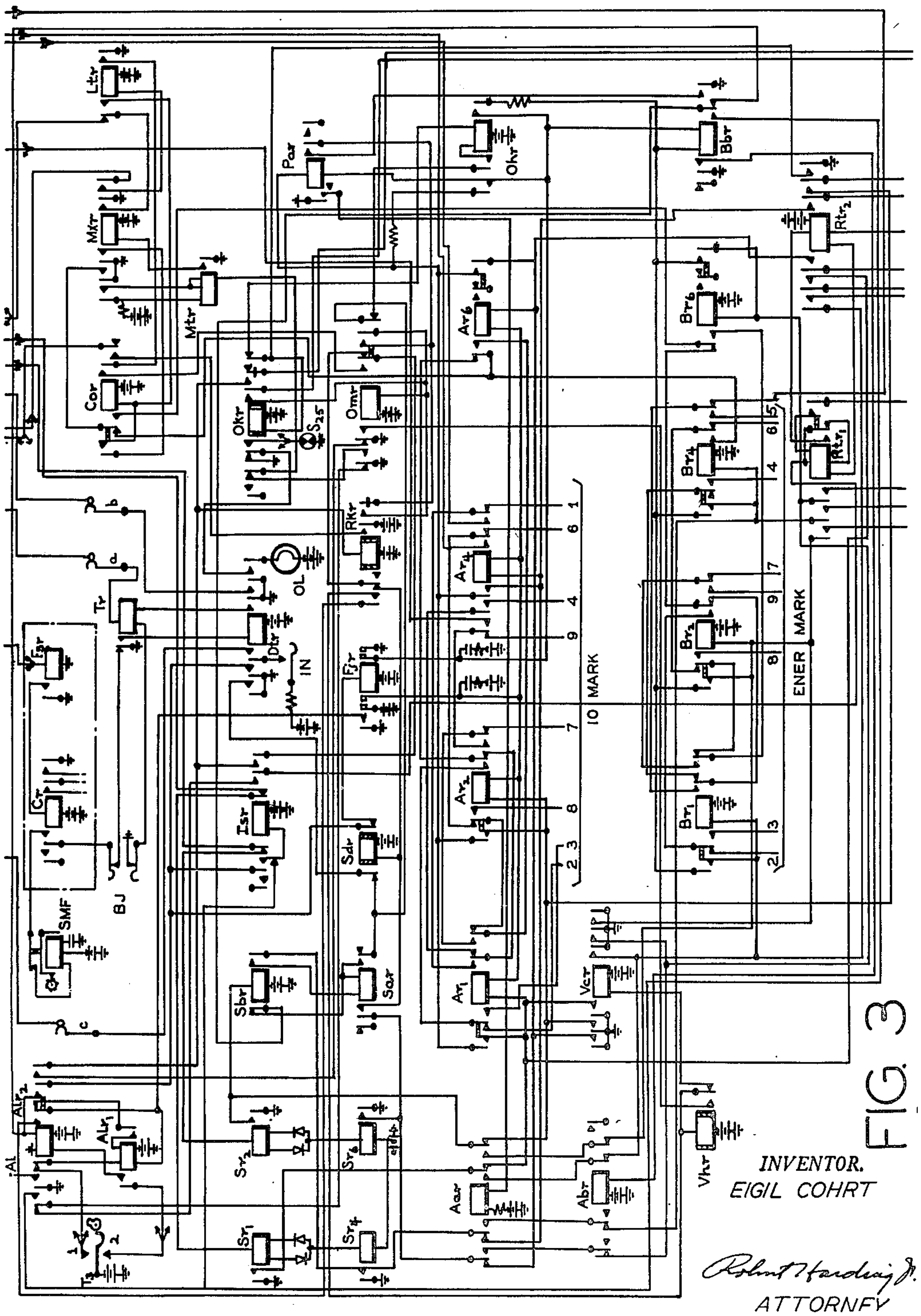
Figure 4:
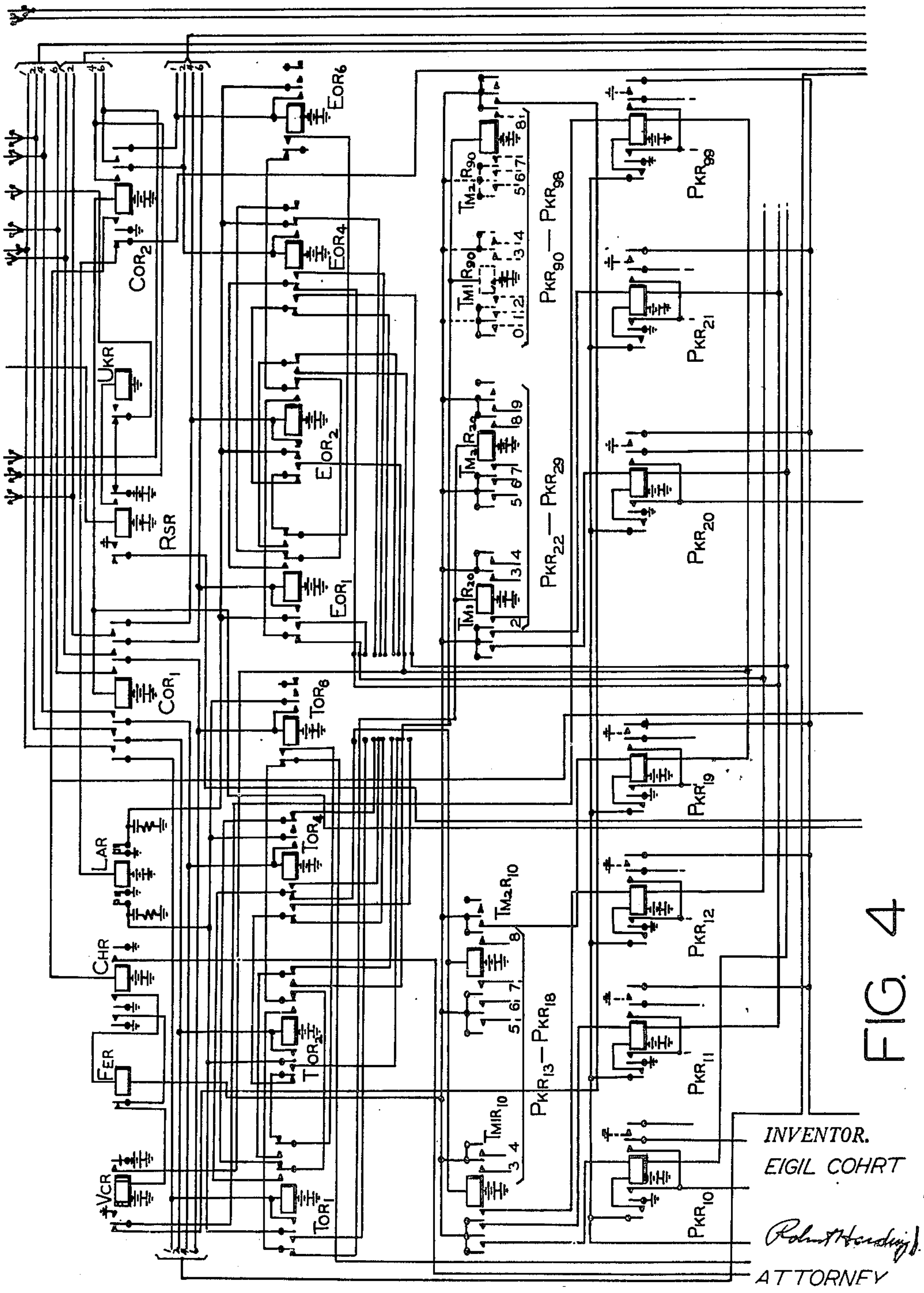
Figure 5B:
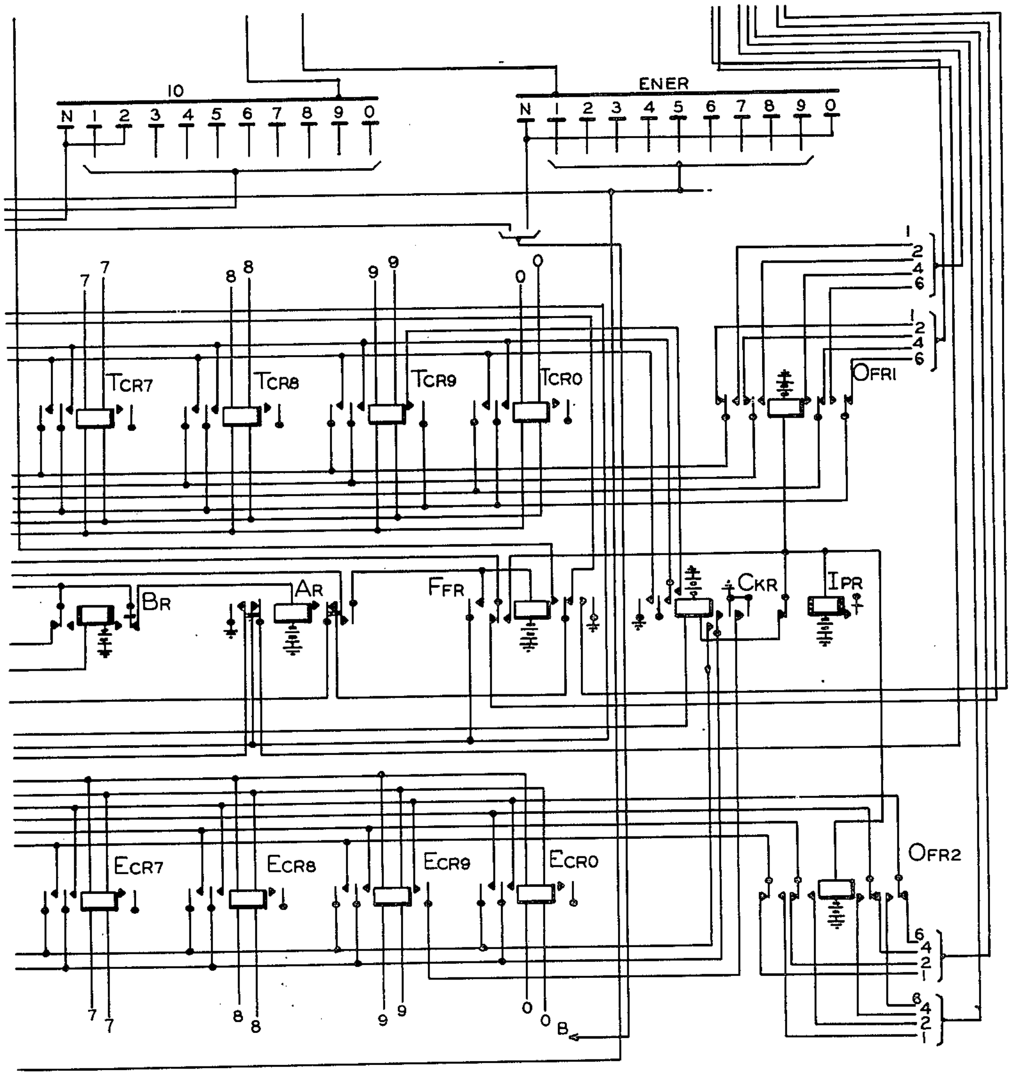

The invention will appear more detailed from the following description in connection with the drawing, on which Fig. 1 shows a schematic of a telephone exchange system according to the invention, Fig. 2 in detail a cord circuit belonging to this system,

Fig. 3 a switch,

Figs. 4 and 5 a concentration circuit; Fig. 5 is to be placed below Fig. 4.

Fig. 1 shows a cord circuit with a line finder LF and a position finder PS. Equipments belonging to each operator's position are connected to the contact sets of the position finder PS. One of these equipments EP has been indicated only. On a control desk each operator's position is represented by a double switch OS with 11 positions marked N–1–2 . . . 0, so that this switch may be adjusted to all digits between 00 and 99. When a position is staffed, this switch must be adjusted either to N—N or to the position's own number. All calls which from other operators' positions are switched over to a position, the switch of which is adjusted in this way, are handled in usual way. If the handling of calls is concentrated in such a way that calls to one position are to be handled by another position, the switch will have to be adjusted to the number corresponding to said other position. All calls that are hereafter routed to the first position will be switched over through switching circuit OMST to the other position by means of a concentration circuit KONC.

At further concentration of the handling of the calls this other position may be adjusted to route the received calls to still a third position.

At the appearance of a call test voltage appears on the contact in question on the contact are *t* of the line finder LF. A starting circuit gets into function via an ST wire, and the line finder rotates by a connection via wires F1 and F2 from ground on the back contact of a relay T*r*. Connection to ground is closed to the 300 ohm winding of the test relay T*r* from the starting circuit via a T wire. When the line finder has been adjusted to the calling line, relay T*r* is energized and the line finder LF stops.

Relay D*tr* is energized and connects ground to the 3 ohm winding of relay T*r* making thereby the contact busy to the other rotating finders, and makes a double test control. The starting relay is shunted and releases so that the starting circuit is released and the remaining rotating finders stop.

The call is then connected to an idle operator's position.

A position finder PS rotates by a circuit via a front contact on relay D*tr* from a back contact on a test relay P*tr* and hunts for an idle operator's position characterized by test voltage on a contact arc *e*, whereas the position is marked by ground connection on one of the contacts of the *t*1 arc.

The test circuit is as follows: the arc *e* of the finder PS, brush *e*, a back contact on relay O*fr*, 300 ohms winding P*tr*, back contact on relay J2*r*, front contact on relay D*tr*, brush and contact arc *t*1.

When the position finder has been connected to an idle operator's position, relay P*tr* is energized and the finder PS stops, whereas a relay P*hr* with a little ohmic resistance is inserted in series with the 3 ohm winding of relay P*tr*, whereby the position is marked busy, and a double test control is made. A relay P*hr* is energized and closes a circuit for a relay C*or*, which is energized and connects the talking circuit through.

At the operator's position the call is marked by a lamp BEL not shown being lighted which lights constantly, battery through a high resistance relay, not shown, being connected to the brush *c* of the finder PS through a winding of a relay C*r* and via the inner left front contact of relay C*or* to ground. Relay C*r* cannot attract its armature, because of the high ohmic relay being inserted in the *c* wire in the position circuit.

When the operator answers this high ohmic relay is short-circuited so that relay C*r* attracts its armature and closes the circuit for the *e* wire toward the line finder. The break cut off relay in the previous circuit is energized in series with the 850 ohm winding of relay C*or* and the test voltage is interrupted, whereby the relays T*r* and D*tr* are released, whereas relay C*or* remains energized. The test voltage in the position circuit is also interrupted and the relays P*tr* and P*hr* are released. Relay O*fr* is connected to the *c* brush of the finder PS in parallel with relay C*r*, but it cannot attract its armature on account of 550 ohms having been inserted in the *c* wire in the position circuit.

When the order has been given the operator releases the connection by interrupting the *c* wire, whereby relay C*r* is released followed by relay C*or*. The *e* wire to the previous circuit is interrupted and this returns to normal.

If the remote exchange is released first, the previous circuit will interrupt the *e* wire, and relay C*or* is released followed by relay C*r*.

A call via a toll line is connected to an idle operator's position in the same way as a local call with the exception that a relay I1*r* is attracted by a connection from ground on contact *h* of the line finder. This causes that a slow speed interrupter S25 is connected to the *c* wire toward the plate circuit and the lamp BEL flashes with quick flashes thereby signifying that the call originates from a toll line. Relay I1*r* is locked to relay C*or*, and when relay C*r* is attracted by the operator answering, it is locked to its own left inner front contact.

The operator may transfer a call from her own position to any other operator's position in the following way:

The button T1 of the keyboard set is depressed a moment connecting ground to the arc *d* of the position finder PS, whereby relay T*er* is energized via a back contact on relay O*fr* and a front contact on relay C*r*. Relay T*er* is locked to ground via a back contact on a relay J*hr* and interrupts the connection—which is now completed via 600 ohms—from the operator. A relay T*e*1*r* is energized via a front contact on relay T*er*, whereby the circuit for relay C*r* is interrupted and this relay is released. Relay C*or* remains energized, a locking circuit being established for this relay via the left outer front contact on relay T*e*1*r*, as this contact is closed, before the circuit for relay C*r* is interrupted.

Start- and test-voltage is sent to the switching circuits via the outer left back contact on relay C*r*, a front contact on relay T*e*1*r* and a back contact on relay J2*r*.

When a switching circuit has been connected to the cord circuit, a connecting relay C*r*1 or C*r*2 corresponding to the switching circuit is attracted and through-connects the cord circuit to the switching circuit, whereupon the "ready-lamp" of the keyboard set is lighted.

By means of her keyboard the operator selects the number of the wanted position, and this number is registered in the switching circuit which in turn by means of the concentration circuit controls whether adjustment can take place to the position in question or to another position, if concentration has taken place.

When the adjustment may commence the position finder will rotate by a circuit from the switching circuit and adjust itself to the position corresponding to the wanted position marked from the switching circuit via the contact arc *t*2.

When the finder PS has been adjusted, the test relay of the switching circuit is attracted, whereby a circuit is closed for relay J2*r* which is energized and causes the following: it is locked to the test voltage and interrupts this from the switching circuit, which is released followed by the connecting relay, it connects the 300 ohm winding of a test relay P*tr* to the test marking circuit, and it prepares a new locking for relay T*er*.

If the operator's position is engaged it may happen that a plurality of cord circuits are waiting for being connected through, and the test, is therefore, arranged in such a way that one test relay only at a time may be connected to the test voltage of the operator's position, as a test marking circuit, not shown, connects battery to the winding of the test relays in turn, and the circuits where test may take place are marked by ground on line 11.

Relay P*tr* is energized when the operator's position is idle followed by relay P*hr*, and the position is thereupon made busy. Together with relay P*hr* relay P*tr* is locked to the test voltage. Via the front contact of relay P*hr* a circuit is closed for relay J*hr*, which is energized and interrupts the circuit for relay Te1*r*, which is released, but before this takes place, relay J*hr* has established a new locking circuit for relay C*or*.

After the release of relay Te1*r* the locking circuit for relay J2*r* is closed via a front contact on relay J*hr*.

Relay I*tr* is energized via a back contact on relay Te1*r* and a front contact on relay J2*r*, and hereby a slow speed interrupter S27 is connected to the *c* line, so that the calling lamp at the operator's position flashes with slow flashes and notifies that a switched-over call is waiting for being answered.

When the operator answers relay C*r* is again energized in the same way as for a normal cell and the test voltage is interrupted so that the relays P*tr*, P*hr* all release. Relay J*hr* interrupts the circuit for relay J2*r* which is also released followed by relay T*er*, and the call is then connected through to the operator.

The function of the switching circuit is briefly as follows: When an operator wants to transfer an arriving call to another operator's position one of the switching circuits will be connected to the cord circuit. The number of the wanted position is registered in the switching circuit by means of the operator's position switch. When the number has been registered, the concentration circuit will be connected, and the called number will be transferred to this, whereupon a control takes place to see whether concentration of the wanted operator's position has taken place or not, i. e. whether the call is to be adjusted to the position in question or to another position, to which the first one has been concentrated. If concentration has not taken place, the concentration circuit sends a signal and is released, whereupon the switching circuit directs the switching over of the position finder of the cord circuit to the wanted operator's position and is then released. If concentration has taken place, the concentration circuit delivers another signal cancelling the number registered in the switch-over-circuit. The new number is then received, whereupon the concentration circuit will be released. The switching circuit then controls the switching-over in the same way as before and is released.

When switching-over is to take place start- and test-voltage is delivered from the cord circuit. A starting relay F*sr* is energized followed by its auxiliary relay C*r* which closes a circuit for a marking selector SMF, which rotates by a connection via its self-interrupter from a back contact on a test relay T*r*.

Relay T*r* is energized when the selector SMF has been adjusted to the calling cord circuit, whereby the selector SMF stops and a circuit is closed for a relay D*tr* which is energized and connects ground to the 3 ohm winding of relay T*r*, so that the cord circuit is made busy to the other control circuit and double test control is made at the same time. The starting relay is shunted and released followed by relay C*r*, and the other marking selector SMF stops.

Via the middle right front contact on relay D*tr* ground is connected to the brush *b* of the selector SMF, and hereby a circuit is closed for the connecting-relay in the cord circuit belonging to the control circuit, the relay is attracted with the cord circuit is now connected to the switching circuit. A busy lamp OL with constant light is lighted.

The digit registering relays S*r*2, S*r*4, and S*r*6 are connected to the operator's position via a back contact on a relay I*sr* and consequently a relay in the position circuit of the operator's position is attracted and lights the ready lamp in the keyboard set.

The relays S*r*1 and S*r*4 are connected to the *a* wire, and the relays S*r*2 and S*r*6 to the *b* wire. The S*r*1 and S*r*2 relays are each provided with two windings with same resistance but with different numbers of winding, and dry rectifiers with oppositely directed current-flow have been inserted in series with the windings. The connecting point between these dry rectifiers has been connected to a 24 volt tapping on the central battery through the low-ohmic relay S*r*4, S*r*6, respectively, i. e. that the receiving device is connected in reality to a source of voltage of 24 volts.

The following 12 signals are transmitted from the operator's position by depression of the respective buttons of the digit-keyboard:

| Digit | *a*-line | *b*-line |
|---|---|---|
| 1 | Voltage through 720 ohms | |
| 2 | | Voltage through 720 ohms. |
| 3 | Voltage through 720 ohms | Do. |
| 4 | Ground through 40 ohms | |
| 5 | Voltage through 40 ohms | |
| 6 | | Ground through 40 ohms. |
| 7 | Voltage through 720 ohms | Do. |
| 8 | | Voltage through 40 ohms. |
| 9 | Voltage through 720 ohms | Do. |
| 10 | Ground through 40 ohms | Ground through 40 ohms. |
| A*n* (Cancellation) | do | Voltage through 40 ohms. |
| TS (Start) | do | Voltage through 720 ohms. |

The signals mentioned in the table actuate the code relays in the following way:

At 48 volt voltage through a resistance of 720 ohms this signal corresponds in reality to a voltage of —24 volts being delivered to the S*r*4 or S*r*6 through the magnetization winding of relay S*r*1 or S*r*2, the dry rectifier allowing passage of current. Relay $Sr1$ or $Sr2$ is attracted, whereas relay $Sr4$ or $Sr6$ remains in normal position, since the current is not sufficiently strong for attracting them.

At 48 volts through a resistance of 40 ohms the same takes place as indicated in the previous paragraph, with the difference, however, that the current is now sufficiently strong so that the relays $Sr4$ and $Sr6$ may also be energized.

At ground through a resistance of 40 ohms this signal corresponds to a voltage of −24 volts and is connected to the relays in a direction opposite to the one mentioned in the two previous cases. The dry rectifier in the magnetization winding circuit of relay $Sr1$ or $Sr2$ now shows blocking direction, and since the secondary winding has not got turns enough for attracting the relays via this winding and 24 volts through 40 ohms, relay $Sr4$ or $Sr6$ only is energized.

The object of the secondary winding of relay $Sr1$ or $Sr2$ is to diminish the attenuating effect of the dry rectifier at the moment of release where the two dry rectifiers act as a short-circuit on the winding. As mentioned the secondary winding has not got turns enough to enable the relay to be energized at ground through 40 ohms. At release after voltage through 40 ohms the fields of the two windings counteract one another and the relay is, therefore, released quickly.

The following table may be given for the code relays:

| Digit | Energized relays | | | |
|---|---|---|---|---|
| 1 | Sr1 | -------- | -------- | -------- |
| 2 | -------- | Sr2 | -------- | -------- |
| 3 | Sr1 | Sr2 | -------- | -------- |
| 4 | -------- | -------- | Sr4 | -------- |
| 5 | Sr1 | -------- | Sr4 | -------- |
| 6 | -------- | -------- | -------- | Sr6 |
| 7 | Sr1 | -------- | -------- | Sr6 |
| 8 | -------- | Sr2 | -------- | Sr6 |
| 9 | Sr1 | Sr2 | -------- | Sr6 |
| 0 | -------- | -------- | Sr4 | Sr6 |
| An | -------- | Sr2 | Sr4 | Sr6 |
| TS | -------- | Sr2 | Sr4 | -------- |

Via a back contact on a relay $Aar$ the first group of decoding relays $Ar1$, $Ar2$, $Ar4$ and $Ar6$ are connected to the front contacts of the relays $Sr1$, $Sr2$, $Sr4$ and $Sr6$.

When a digit button is depressed one or more of the relays $Sr$ is/are attracted in accordance with the above table followed by the corresponding relays $Ar$. Supposing that digit-button 4 has been depressed relay $Sr4$ is attracted followed by relay $Ar4$ from voltage on a relay $Fjr$ which is energized from a front contact on relay $Dtr$ via a back contact on a relay $Sdr$. Via a front contact on relay $Ar4$ a locking circuit is prepared for this relay in series with a relay $Par$, which, however, is short-circuited as long as the digit-button is depressed. When the digit-button is released, relay $Sr4$ is released, and the short-circuit on relay $Par$ is now interrupted, so that this relay is attracted in series with relay $Ar4$ which remains attracted, since its locking circuit as mentioned has been established through the winding of relay $Par$. This relay closes a circuit for a relay $Aar$, which is energized extremely quickly and shifts the receiving relays over to the next series of relays. The following digit is received on the decoding relays $Br$, and a relay $Bbr$ is energized.

The number of the wanted operator's position has now been registered on the decoding relays $Ar$ and $Br$, and the numerical value of the digits may be read off directly by adding the indexes of the relays. If the relays $Ar1$, $Ar2$ and $Ar6$ have been energized the stored digit is $1+2+6=9$.

If the operator makes a faulty keyboard selection or selects a wrong number, a cancellation may be made by depressing a cancellation button AN which causes attraction of relays $Sr2$, $Sr4$ and $Sr6$. A relay $Sr2$ closes a circuit for relay $Sbr$ which is energized, relay $Sr4$ closes a circuit for relay $Sar$ which is also energized, and finally relay $Sdr$ is energized via a front contact on relay $Sar$ from the $Sr6$ relay and interrupts the circuit for relay $Fjr$ which interrupts the locking circuit for all the attracted relays in the two series of relays, which are released. When the button AN releases, the relays $Sbr$, $Sar$ and $Sdr$ are again released and relay $Fjr$ is again energized, whereupon the operator may again select a number.

When the operator has selected the wanted number the keyboard button TS is depressed, whereby the relays $Sr2$ and $Sr4$ are energized followed by the relays $Sbr$ and $Sar$.

When the button TS is released, the relays $Sr2$, $Sr4$ and $Sbr$ are released, whereas relay $Sar$ remains locked via a back contact on relay $Sdr$, whereby a circuit is closed for relay $Isr$ via a back contact on relay $Sbr$ and a front contact on relay $Bbr$. Relay $Isr$ is attracted and locked and interrupts the receiving relays from the operator's position.

The concentration circuit is now connected to the switching circuit, following circuit being closed for the connecting relays $Rtr1$ and $Rtr2$: ground, left outer back contact on relay $Omr$, back contact on relay $Atr2$, right middle front contact on relay $Isr$, right inner back contact on relay $Rtr1$, 250 ohm winding on relay $Rtr1$, 250 ohm non-inductive resistance on relay $Rtr2$, back contact on relay $Ukr$ in the concentration circuit, back contact on relay $Rsr$, battery.

If the concentration circuit is idle, relay $Rtr1$ is energized and locked to the concentration circuit via its second winding via contacts on the other relays $Rtr1$, in order to be sure that one switching circuit only can be connected to the concentration circuit at a time. Relay $Rtr2$ is attracted via a front contact on relay $Rtr1$ followed by relay $Okr$ which is slow to attract, whereupon the concentration circuit is connected to the switching circuit.

The busy lamp OL is connected to the slow speed interrupter S25 via relay $Okr$ and it flashes with quick flashes as long as the concentration circuit is connected. Before relay $Okr$ is attracted relay $Ohr$ is energized via a back contact on relay $Okr$ and is locked via a separate winding. Relay $Ohr$ shunts the relays $Par$ and $Bbr$ with a resistance of 100 ohms each, so that the voltage on the $Ar$ and $Br$ relays is increased so much, that the receiving relays in the concentration circuit may be energized. Relays $Par$ and $Bbr$ both remain attracted.

The transmitted number is transferred to the concentration circuit by each of the $Ar$ and $Br$ relays having their respective connection to the concentration circuit, for which reason a corresponding $Ar$ or $Br$ relay is attracted in this, so that both of the digits are transferred simultaneously when the concentration circuit is connected.

If the concentration circuit ascertains that switching-over may take place instantly it causes magnetization of a switching-over relay $Omr$ via a front contact on relay $Okr$ from ground connected to line 11 applied by the concentration circuit. Relay Omr is locked to ground via the front contacts of relays Par and Bbr. Relay Omr interrupts the circuit for relays Ohr and Rtr1, both of which release followed by relays Rtr2 and Okr, and the concentration circuit is again idle. The lamp OL again lights constantly.

If switching-over is to take place to another operator's position the number registered in the switching circuit is first to be cancelled and this takes place in the following way:

Relay Sdr is energized from the concentration circuit via back contacts on the relays Rkr and Omr and the front contacts on the relays Isr and Okr and interrupts the circuit for relay Fjr which is released and interrupts the battery supply to the decoding Ar- and Br-relays which all release so that the number transmitted is cancelled. Relay Ohr is released and interrupts the shunt on the relays Par and Bbr. Relay Rkr is attracted in parallel with relay Sdr, but since relay Rkr is slow to energize it is attracted an instant after relay Sdr and interrupts the circuit for this relay which releases, whereupon relay Fjr is again attracted and connects battery to the decoding Ar- and Br-relays. The new number is adjusted from the concentration circuit as the decoding Ar- and Br-relays in question are attracted directly followed by the relays Par and Bbr. Via these two latter relays a circuit is closed for relay Omr via a front contact on relay Rkr, and relay Omr is locked directly and not through the front contact of relay Rkr.

When relay Omr interrupts its left outer back contact the relays Rtr1, Rtr2, Okr and Rkr are released, and the concentration circuit is again idle.

When the switching relay Omr has been energized switching may take place. As there are two common control circuits per marking multiple the switching circuit at first makes a control in order to ascertain whether the multiple is idle, and if this is so it seizes it and makes it busy to the other switching circuit in the following way: a test resistance with test voltage which is common to both of the control circuits is connected to ground on the front contact of relay Omr through the 1000 ohm winding of the test relay Mhr. If the multiple is idle, relay Mtr, is energized and short-circuits its high ohmic winding so that the test voltage is made busy through its 2, 5 ohm winding. Relay Mtr closes a circuit for a relay Mxr which is energized. Via a front contact on this relay and a back contact on a relay Ltr a circuit is closed for the position finder PS of the cord circuit and PS now rotates and hunts for the 10-marking which is received via the A relays from the middle left front contact on relay Mxr and the inner left back contact on relay Cor. The test relay Ltr is connected to the brush t2 of the position finder PS.

When the finder PS has been adjusted to the first contact in the wanted 10-group, relay Ltr is attracted and closes a circuit for relay Cor which is energized and locked to relay Mxr and changes the marking from the Ar relays to the Br relays before relay Rkr has got time to attract its armature. Relay Ltr is released and the finder continues to rotate and is adjusted to the units-marking, whereupon relay Ltr is again attracted and stops the finder PS. Via front contacts on the relays Ltr and Cor a circuit is closed for a relay Rkr which is slow to operate and closes a circuit for relay J2r in the cord circuit via a front contact on relay Cor. The attraction of relay Rkr in connection with relay Cor indicates that the switching is finished. Relay J2r causes interruptions of the test voltage whereupon the relays Tr, Dtr, Fjr and all the other relays in the switching circuit are released, and the circuit is again ready for new switchings. When relay Omr is released the multiple is again disengaged.

If the units digit is 0 the finder PS will remain on the 10-marking line, as the units marking line "0" is connected directly to the 10-marking line in the switching circuit.

If the operator selects no number the call is transferred to the supervisor after a certain period in the following way: As soon as the control circuit is connected a circuit is closed for an alarm relay Alr1 from a front contact on relay Fjr the first time contact 1 of an impulse generator T3 is closed. Relay Alr1 is energized and locked via a special winding.

About 30 seconds later contact 2 of the impulse generator closes a circuit for a relay Alr2 which energizes and locks to relay Dtr and releases relay Alr1. Relay Isr is energized from the back contact of relay Omr via a front contact on relay Alr2. Since the receiving relays are now interrupted from the operator's position the keyboard lamp will be extinguished. Relay Sdr is energized via back contacts on the relays Rkr and Omr and via front contacts on the relays Isr and Alr2. Relay Rkr is energized slowly in parallel connection with relay Sdr, and the number transmitted is cancelled as previously explained.

Via the outer left front contact on relay Rkr a circuit is closed for the relays Vhr and Ver from another front contact on relay Alr2. A relay Vcr is attracted an instant until relay Vhr interrupts its back contact and adjusts the supervisor number "99" on the decoding relays Ar and Br. After the release of relay Vcr the relays Par and Bbr are attracted, whereby a circuit is closed for relay Omr which is energized and causes switching to the supervisor in the same way as already explained.

If no signal is received from the concentration circuit due to some fault in this, the call will be transferred to the supervisor as previously explained, whereas the concentration circuit will be released, relay Alr2 interrupting the circuit for relay Rtr1.

The function of the concentration circuit will now be described. If concentration of the operator's position takes place and a position is to be operated by another position the switch on the position in question is to be adjusted to the number corresponding to the position, to which concentration has been made. All calls which are hereafter adjusted to the first position will be routed to the new position by the concentration circuit in the following way: At each switching the concentration circuit gets connected to the switching circuit and the number transmitted will be transferred to the receiving relays in the concentration circuit, Figs. 4 and 5, whereupon a position relay belonging to the wanted operator's position will energize (PKr00–Pkr99). This relay connects the switch belonging to the position to 10-digit relays Tcr1–0 and Ecr1–0. If the position has not been switched to another position and the switch is in position N—N, a signal will be given to the switching circuit, whereupon the switching takes place as previously explained.

If on the other hand the position has been switched and the switch is for instance on 4—5, the call will have to be adjusted to position 45.

Via the switch which is in position 4—5 the 10-digit relay Tcr4 and the units-digit relay Ecr5 are attracted. At the same time the number transferred to the concentration circuit is cancelled, and instead of this number 45 is registered from the relays Tcr4 and Ecr5. The position circuit relay Pkr45 corresponding to position 45 is energized and connects the switch corresponding to the position which is in position N—N or 4—5. The relays Tcr4 and Ecr5 are again energized, but since the position of the switch indicates that the position is staffed a signal is sent to the switching circuit where the number transmitted is cancelled and number 4—5 is registered on the digit registering relays, whereupon the concentration circuit is released.

If position 45 is switched over, for instance to position 50, all calls to the original position as well as to position 45 will be routed to position 50. It is not necessary to alter the position of the switch on the original position which is still on 4—5. On the other hand the switch on position 45 will be adjusted to 5—0.

The control takes place as explained above until the control of the switch on position 45 is to take place. As this is no more on N—N but on 50, the receiving relays will be adjusted to number 50, and relay Pkr50 is attracted. The relays Tcr5 and Ecr0 are energized via switch "50," and since this is on N—N the digits 5—0 will be transferred to the switching circuit and indicate that the call is to be adjusted to position 50, whereupon the concentration circuit is released.

The circuit operation of the concentration circuit will now be described in detail. The fact that the concentration circuit is idle is characterized by voltage on the right back contact of a relay Rsr. When the concentration circuit is connected to a switching circuit relay Rsr is attracted in series with the connecting relay Rtr1 in the switching circuit in question and closes a circuit for a relay Ukr which interrupts the control line. The busy lamp OL is lighted.

The number transmitted is transferred to the concentration circuit in the following way: The following circuit is closed for relays Cor1 and Cor2: ground, left front contact on relay Rsr1, right back contact on relays Dr, Ar and Ffr, winding on relay Cor1 and Cor2 in parallel connection and to battery.

The relays Cor1 and Cor2 are energized and the 10-transfer relays Tor1–4 and the units-transfer-relays Eor1–4 of the concentration circuit are connected in parallel connection to the digit registering relays of the switching circuit, so that the corresponding relays in the concentration circuit are attracted, and the number registered in the switching circuit is hereby transferred to the concentration circuit.

It is assumed that the wanted operator's position is staffed and not switched over. In order to facilitate the understanding it is assumed that switching is wanted to position No. 13. That is to say that the relays Tor1, Eor1 and Eor2 are energized.

A circuit is closed for the 10-marking relays Tm1r10 and Tm2r10 as follows: ground, left inner back contact on relay Ibr, left back contact on relay Tor6, right inner back contact on relay Tor2, right inner front contact on relay Tor1, marking wire 1, winding on relay Tm1r10 and Tm2r10, battery.

The function of the relays Tcr is in other words to attract the marking relays corresponding to the 10-group.

A relay Chr is energized from relay Cor2 at the connection of the concentration circuit and by means of this relay and the relays Eor the position relay Pkr13 corresponding to the wanted operator's position is now selected.

Relay Pkr13 is energized in the following circuit: ground, left inner front contact on relay Chr, winding on relay Fer, right inner front contact on relay Tm1r10, 1000 ohm winding on relay Pkr13, marking line 3, left outer front contact on relay Eor1, right inner front contact on relay Eor2, left back contact on relay Eor6, battery.

Relay Fer is energized in series with relay Pkr13 before the slow to operate relay Vcr has got time to be energized. It will be explained later on what happens if relay Fer for some reason or other is not energized.

The operator's position being operated relay Pbr is energized via the right outer front contact on relay Pkr13 from relay Ojr in the operator's position 13.

Relay Pkr13 is now over switch 13 connected to the control relays Tcr and Fcr.

Switch 13 stands on N—N or 1—3, as the position has not been switched-over.

Via the 10-contacts of the switch a circuit is closed for relay Tcr1 (10-digit 1) and via the units-contacts for relay Ecr3 (units-digit 3), and both of these relays are energized. All relays Tcr and Ecr have got two windings, a left winding, contact row B, is connected to the switches in accordance with the position's 10 and units digit, whereas the right winding, contact row A, is connected to all the outer contacts.

On switch 13 relay Tcr1, contact row B, is connected to contact N and 1 on the 10-contact part, and relay Ecr3, contact row B, to N and contact 3 on the units-contact part, relay Tcr2, contact row A, is connected to contact 2, relay Tcr3, contact row A, contact 3 and so on on the 10-contact part; relay Ecr1, contact row A, contact 1, relay Ecr2, contact row A, contact 2, relay Ecr4, contact row A, contact 4, and so on on the units-contact part.

In other words when a relay Pkr is attracted, a relay Tcr and Ecr corresponding to the position of the switch are energized via left winding, contact row B, when the switch is on the position corresponding to the number of the position, and via right winding, contact row A, when the position of the switch corresponds to all other numbers.

In the present case the relays Epr1 and Epr2 are energized, own position relay, in series with the relays Tcr1 and Ecr3. When both of these relays are attracted switching is to take place to the position, the number of which has been registered in the switching circuit.

Via relays Epr1 and Epr2 and a front contact on a relay Pbr, position staffed relay, a circuit is closed for relay Omr of the switching circuit which is energized and releases the concentration circuit, relay Rsr being released followed by all energized relays. When relay Ukr1, which is slow to release, closes its back contact the concentration is again idle.

All the operations described above take place in about 0,1 second.

It is assumed that the wanted operator's position is switched-over, position 13 being switched over to position 12. The switch of position 13 is now adjusted to 1—2, and the control takes place as previously explained with the exception that the relays $Tcr1$ and $Ecr2$ are now energized instead of the relays $Tcr1$ and $Ecr3$. The attraction of these relays was of no consequence in the case previously explained. Relay $Tcr1$ will be energized as before in series with relay $Epr1$, but relay $Ecr2$ is energized in series with a relay $Apr2$, second position relay, and the circuit for relay $Omr$ previously mentioned is, therefore, interrupted.

Two simultaneous functions take place now, i. e. the number transmitted to the switching circuit is cancelled and the number transferred to the concentration circuit is cancelled. Out of regard to the first function relay $Apr2$ closes a circuit for relay $Ar$ via a back contact on a relay $Br$, and relay $Ar$ is energized and closes a circuit for relay $Ffr$, which is energized and locked to ground on relay $Rsr$. Relay $Ffr$ closes a circuit for relay $Sdr$ in the switching circuit which—as explained in the description of this circuit—causes cancellation of the number transmitted. In view of the other function the circuit is interrupted via relay $Ar$ and $Ffr$ for relay $Cor1$ and $Cor2$ which both release followed by the relays $Tor$ and $Eor$ and relay $Tm1r10$ and $Tm2r10$. On the other hand the position relay $Pkr13$ cannot release as meanwhile it has got established a locking circuit to the left outer front contact on relay $Ar$. Relay $Pkr13$ is in other words still energized a moment, and thereby the number of the position to which switching has taken place, is kept on the relays $Tcr$ and $Ecr$.

Via a back contact on relay $Br$ a circuit is closed for relay $Cr$ which is attracted followed by relay $Dr$, which doubles the locking circuit established by relay $Ar$ for relay $Pkr13$. Via a front contact on relay $Dr$ a circuit is closed for relay $Br$, which is slow to attract and opens the circuits for the relays $Ar$ and $Cr$. Relay $Ar$ is released immediately and closes the circuit for relay $Lar$ via a back contact on relay $Cor2$. Relay $Lar$ is attracted and prepares a locking circuit for the relays $Tor$ and $Ecr$.

Relay $Cr$ releases slowly and interrupts the circuit for relay $Dr$, but before this relay, which is slow to release, is interrupted, a circuit is closed for relay $Ckr$ which is attracted an instant until the release of relay $Dr$.

In reality the relays $Tcr$ and $Ecr$ correspond to the keys in a keyboard set, and via the front contacts of relays $Tcr1$ and $Ecr2$ a circuit is closed from relay $Ckr$ for the relays $Tor$ and $Eor$ in accordance with the predetermined code, and in the assumed case the relays $Tor1$ and $Eor2$ corresponding to No. "12" are energized. These relays are locked to relay $Lar$, and a minute later relay $Dr$ is released followed by relay $Br$. The locking circuit for relay $Pkr13$ is interrupted, and this relay is released followed by the relays $Tcr1$, $Ecr2$, $Epr1$ and $Apr2$. The new position number 12 is now registered on the receiving relays, and when relay $Chr$ is attracted via the right back contact on relay $Dr$, the control is made by position 12 in the very same way as already described.

The same cycle is repeated until the circuit finds a switch standing on N—N or the number corresponding to the operator's position, so that both relay $Epr1$ and $Epr2$ are energized.

When this happens a circuit is closed for the relays $Ofr1$ and $Ofr2$ via a front contact on relay $Ffr$, and at the same time a circuit is closed for relay $Ckr$ via a back contact on a relay $Ipr$ which is slow to energise. Relay $Ckr$ is attracted a moment and delivers the signals corresponding to the number of the operator's position in question, which via front contacts on the relays $Ofr1$ and $Ofr2$ are transferred to the switching circuit, where the digit registering relays are adjusted to the number in question.

Relay $Rsr$ will now be interrupted from the switching circuit and the concentration circuit is released and idle.

If somebody tries to switch-over to a non-staffed operator's position but where the switch is nevertheless on N—N, the call will be switched to the supervisor "99" in the following way.

After attraction of the $Pkr$ relay in question relay $Pbr$ remains in normal position, and via a front contact on the relays $Epr1$ and $Epr2$ a circuit is closed for relay $Ibr$ which is energized and locked to relay $Chr$. A relay $Ibr$ interrupts the marking ground connection for the 10-marking relays, so that the relays $Tm1r$ and $Tm2r$ as well as relay $Pkr$ are released followed by the relays $Tcr$, $Ecr$, $Epr1$ and $Epr2$.

The relay $Fer$ inserted in series with relay $Pkr$ is released, whereby a circuit is closed for relay $Vcr$, which is attracted, and this relay closes a circuit for relay $Pkr99$ which is energized. Relay $Pbr$ is energized again, and the control takes place in normal way. The relays $Tcr9$ and $Ecr9$ and both of the $Epr$ relays are energized, and switching takes place as previously explained. If the supervisor has adjusted her switch to another position, the control will take place in the same way as for a normal operator's position, one or both of the $Apr$ relays being attracted.

If somebody tries to switch-over to a non-existing position, i. e. a position where the $Pkr$ relay is not mounted, relay $Fer$ cannot energize, which causes magnetization of relay $Vcr$ and the switching-over to the supervisor.

I claim:

1. In a telephone exchange system, operators' positions, means for concentrating the traffic at said positions, a concentration circuit, common to all said positions, selective switching apparatus associated with said concentration circuit for connecting to any one of said positions, settable switch means at each operators' position adapted to be set in any one of a plurality of settings each indicating a different operator's position, means associated with said concentration circuit and responsive to an incoming call at an operator's position where the settable switch means is set to indicate another operator's position for taking into use said selective switching apparatus and said concentration circuit, and means connected to and controlled by said concentration circuit for causing said selective switching apparatus to select the operator's position corresponding to the setting of said settable switch means and to transfer the incoming call thereto.

2. In a telephone system, the combination, according to claim 1, further comprising a cord circuit to connect the concentration circuit and the selective switching apparatus to the operator's position, and in which said concentration circuit is provided with means for testing the operator's position designated by the settable switch means to determine if settable switch of the latter has been set to indicate still another position, and means controlled by said last mentioned means for causing said selective switching apparatus to select and switch the incoming call to said last mentioned position.

3. In a telephone system, the combination, according to claim 2, in which means is provided in the concentration circuit for successively selecting the positions in a successive concentration.

4. In a telephone system, the combination, according to claim 3, in which the concentration circuit is provided with means under control of the successive selecting means for altering the selective switching apparatus in accordance with the indication of the settable switch means of the last selected position.

5. In a telephone system, the combination, according to claim 4, in which relay means is provided for determining whether or not the operation of the successive selecting means is to continue.

6. In a telephone system, the combination, according to claim 1, in which the concentration circuit comprises a plurality of position circuit relays for selecting the settable switch belonging to a called position.

7. In a telephone system, the combination, according to claim 6, in which means is provided for selecting the position relays and comprises a plurality of tens transferring relays and a plurality of units transferring relays.

8. In a telephone system, the combination, according to claim 1, in which a supervisor's position is provided and means is provided in the concentration circuit for switching a call to said supervisor if the circuit fails to switch the call to a position.

9. In a telephone system, the combination, according to claim 8, in which the means for switching the call to the supervisor operates after a predetermined lapse of time.

EIGIL COHRT.

REFERENCES CITED

The following references are of record in the file of this patent:

UNITED STATES PATENTS

| Number | Name | Date |
|---|---|---|
| 1,259,967 | Dyson | Mar. 19, 1918 |
| 1,279,811 | Williams | Sept. 24, 1918 |
| 1,299,606 | Polinkowsky | Apr. 8, 1919 |